United States Patent
Scholhamer et al.

[11] Patent Number: 5,946,495
[45] Date of Patent: Aug. 31, 1999

[54] DATA COMMUNICATION CIRCUIT FOR CONTROLLING DATA COMMUNICATION BETWEEN REDUNDANT POWER SUPPLIES AND PERIPHERAL DEVICES

[75] Inventors: George J. Scholhamer, The Woodlands; Michael S. Zandy, Spring, both of Tex.

[73] Assignee: Compaq Computer Corp., Houston, Tex.

[21] Appl. No.: 08/838,366

[22] Filed: Apr. 8, 1997

[51] Int. Cl.[6] .............................. G06F 1/26; G06F 13/00; H02J 1/00
[52] U.S. Cl. ............................ 395/750.01; 395/182.12; 395/651; 395/284; 307/43
[58] Field of Search ................ 395/750.01, 750.07, 395/750.08, 182.12, 284, 651, 828, 830; 307/43, 52, 62, 80, 81, 85, 86, 87, 125, 137

[56] References Cited

U.S. PATENT DOCUMENTS

| | | |
|---|---|---|
| 4,405,867 | 9/1983 | Moakler et al. ........................ 307/64 |
| 4,520,275 | 5/1985 | Marusik ..................................... 307/64 |
| 4,734,844 | 3/1988 | Rhoads ...................................... 363/72 |
| 5,157,771 | 10/1992 | Losi et al. ............................... 395/283 |
| 5,202,965 | 4/1993 | Ahn et al. ................................ 395/283 |
| 5,268,593 | 12/1993 | Hayasaki ................................. 307/125 |
| 5,557,738 | 9/1996 | Townsley et al. ................. 395/182.12 |
| 5,586,271 | 12/1996 | Parrett ..................................... 395/283 |
| 5,625,777 | 4/1997 | Takahashi et al. ...................... 395/283 |
| 5,638,540 | 6/1997 | Aldous ................................. 395/750.01 |
| 5,719,490 | 2/1998 | Germini .................................. 323/265 |
| 5,732,281 | 3/1998 | Summers et al. ....................... 395/828 |
| 5,758,101 | 5/1998 | Pemberton .............................. 395/283 |

*Primary Examiner*—Ayaz R. Sheikh
*Assistant Examiner*—Sumati Lefkowitz
*Attorney, Agent, or Firm*—Jenkens & Gilchrist P.C.

[57] ABSTRACT

In a computer system having redundant power supplies, an I²C data bus architecture it utilized to provide communication between the power supplies and other computer peripherals connected to the I²C bus. A switch separates the power supplies from the other peripheral devices, such that the switch, when open, isolates the power supplies from the other devices, so that during power-up the power supplies can communicate over the I²C bus. When the switch is closed, the switch becomes transparent and connects the peripherals with the power supplies over the I²C bus.

15 Claims, 2 Drawing Sheets

DATA COMMUNICATION CIRCUIT FOR CONTROLLING DATA COMMUNICATION BETWEEN REDUNDANT POWER SUPPLIES AND PERIPHERAL DEVICES

FIELD OF THE INVENTION

The present invention relates to data busses, and more particularly, but not by way of limitation, to a data communication bus architecture wherein at least a portion of the data communication bus can be isolated to permit uninterrupted data communication between devices connected to the isolated portion of the data communication bus.

BACKGROUND OF THE INVENTION

The I²C (inter-integrated circuit) bus is a bi-directional two wire bus that provides low speed direct data communication between I²C compatible devices on a circuit board. One advantage of the I²C bus is that it eliminates many interfacing difficulties associated with other types of data buses. Generally, I²C buses utilize a master/slave configuration, such that the master devices can communicate to all the other devices, while the slave devices generally respond to the data received over the I²C bus. Some I²C bus configurations also allow for a multi-master configuration and utilize collision detection and arbitration to prevent data corruption. Generally, the number of peripheral devices that can be connected to the I²C bus is limited by the capacitance value of the bus.

The early versions of the I²C bus did not have any set specifications for manufacturers to follow when designing I/O buffers to interface therewith. In fact, in many of the early versions of the I²C bus, if a device connected to the I²C bus did not have any power applied to the device, the configuration of I/O pins on the device would shunt the bus to ground. This would disable the I²C bus preventing communication between all of the devices connected thereto. For example, many devices used electrostatic discharge (ESD) diodes on the I/O pins to protect the device from electrostatic discharge when powered down. In these devices, when power is lost to the device, the ESD diodes will load the bus and pull it to ground because the diodes are there to shunt static discharges to ground. This in turn, disables the I² C bus and prevents any data communication between the other peripheral devices on the bus. Among other things, this creates a problem when bus communication is needed between two or more devices when most of the devices on the I²C data bus are powered down. Such is the case, for example, when a system has redundant power supplies that use I²C to coordinate operation. During the start-up of a system with redundant power supplies, the redundant power supplies must communicate therebetween to establish the proper operating parameters of the power supplies. If the I²C data bus is disabled, communication over the bus can not occur, thereby preventing the power supplies from operating properly.

Therefore, it is highly desirable to have a device or bus architecture that permits data communication between at least two devices, when power has been disabled from at least one of the remaining peripheral devices connected to the data bus.

SUMMARY OF THE INVENTION

The present invention overcomes the above identified problems as well as other shortcomings and deficiencies of existing technologies by providing a data communication bus architecture wherein at least a portion of the data communication bus can be isolated to permit uninterrupted data communication over the bus between devices connected to the isolated portion of the data communication bus.

The present invention further provides a computer system utilizing redundant power supplies and an I²C data bus architecture, with the redundant power supplies and multiple peripheral devices connected to the I²C data bus. The I²C data bus is configured so that the power supplies can be connected to the I²C bus and isolated from the peripheral devices during power-up of the computer system so that the power supplies can communicate over the I²C bus, and further the power supplies can be connected to the other peripheral devices over the I²C data bus when the computer system is powered up.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
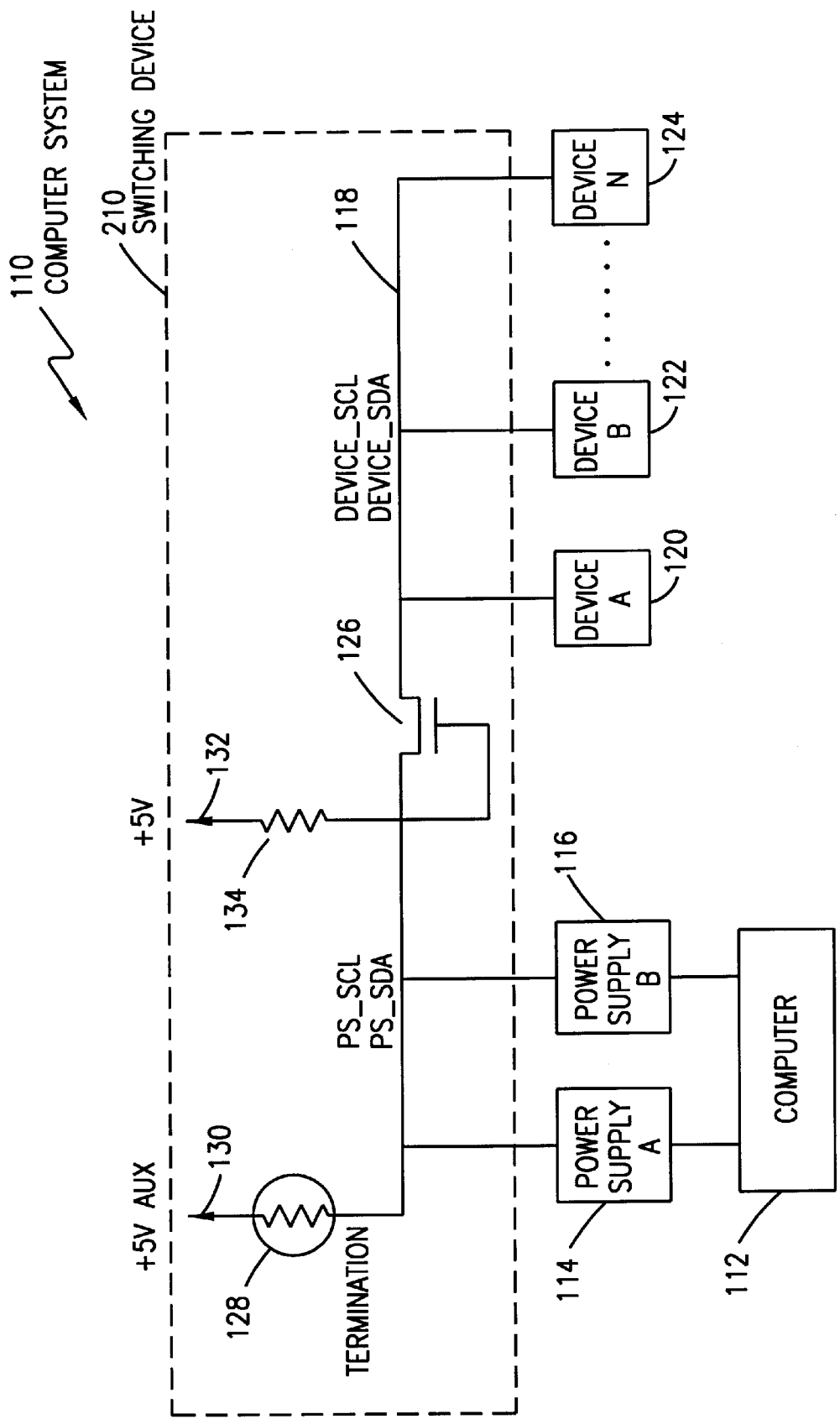
FIG. 1 is a schematic block diagram of a computer system utilizing the present invention.

With reference to FIG. 1, there is shown a schematic block diagram of an exemplary embodiment of a computer system 110 illustrating the utilization of the present invention. The purpose of this block diagrams is to illustrate, among other things, the features of the present invention and the basic principles of operation thereof. This block diagram is not necessarily intended to schematically represent particular modules of circuitry or control paths.

As depicted, computer system 110 includes a computer 112, power supplies 114 and 116, an inter-integrated circuit (I²C) bus 118, peripheral devices 120, 122 and 124, a MOSFET switching device 126, termination 128, a +5 volt auxiliary supply 130, a +5 volt input 132, and a resistive device 134. Power supplies 114 and 116, along with peripheral devices 120, 122 and 124 are each connected to and communicate over I²C bus 118, with power supplies 114 and 116 separated from devices 120, 122 and 124 by MOSFET 126. MOSFET 126 is further connected to resistive element 134 and power input 132 and is used to isolate power supplies 114 and 116 on the I²C bus 118 from devices 120, 122 and 124 when in the open state. Although good results have been achieved using a MOSFET switching device, it is contemplated to be within the scope of this invention that other types of switching mechanisms could be utilized, such as a relay or the like.

Still referring to FIG. 1, as illustrated in this exemplary embodiment, power supplies 114 and 116 are configured as redundant power supplies for computer system 110, and supply power to devices 120, 122, and 124, and input 132. In operation, power supplies 114 and 116 communicate together over I²C bus 118. One of power supplies 114 and 116 will operate in the master mode, with the other operating in the slave mode. This permits the power supply operating in the master mode to communicate with the power supply operating in the slave mode such that the proper output can be set, with both power supplies sharing the load to the system in a selected manner. After the power-up of computer system 110 and during the operation thereof, the power supply operating in the master mode monitors the operating voltages within the computer system for needed power output adjustment and communicates through the I²C bus to adjust the slave mode power supply to maintain acceptable voltage levels within selected limits.

Still referring to FIG. 1, the general operation of computer system 110 will now be described. Power input 130 is connected to a +5 volt auxiliary power, which is supplied by power supply 114 or power supply 116 and is always present for the proper termination of I²C bus 118. Power supplies 114 and 116 generally supply power to the computer system 110, including devices 120, 122 and 124, but are separated therefrom by MOSFET switching device 126. MOSFET switching device 126, when in the "open" state, disconnects power supplies 114 and 116 from devices 120, 122 and 124, but still permits the power supplies to communicate over the isolated portion of the I²C data bus. When either of power supplies 114 and 116 are powered up, power input 132 will receive power therefrom, "closing" MOSFET switching device 126. When MOSFET switching device 126 is closed, the I²C data bus 118 is connected between power supplies 114 and 116 and peripheral devices 120, 122 and 124 and is transparent thereto providing a continuous connection. As described above, when MOSFET switching device 126 is open, such as during power-up, the I²C data bus 118 is disconnected between power supplies 114 and 116 and peripheral devices 120, 122 and 124. However, power supplies 114 and 116 can still communicate over I²C bus 118.

Figure 2:
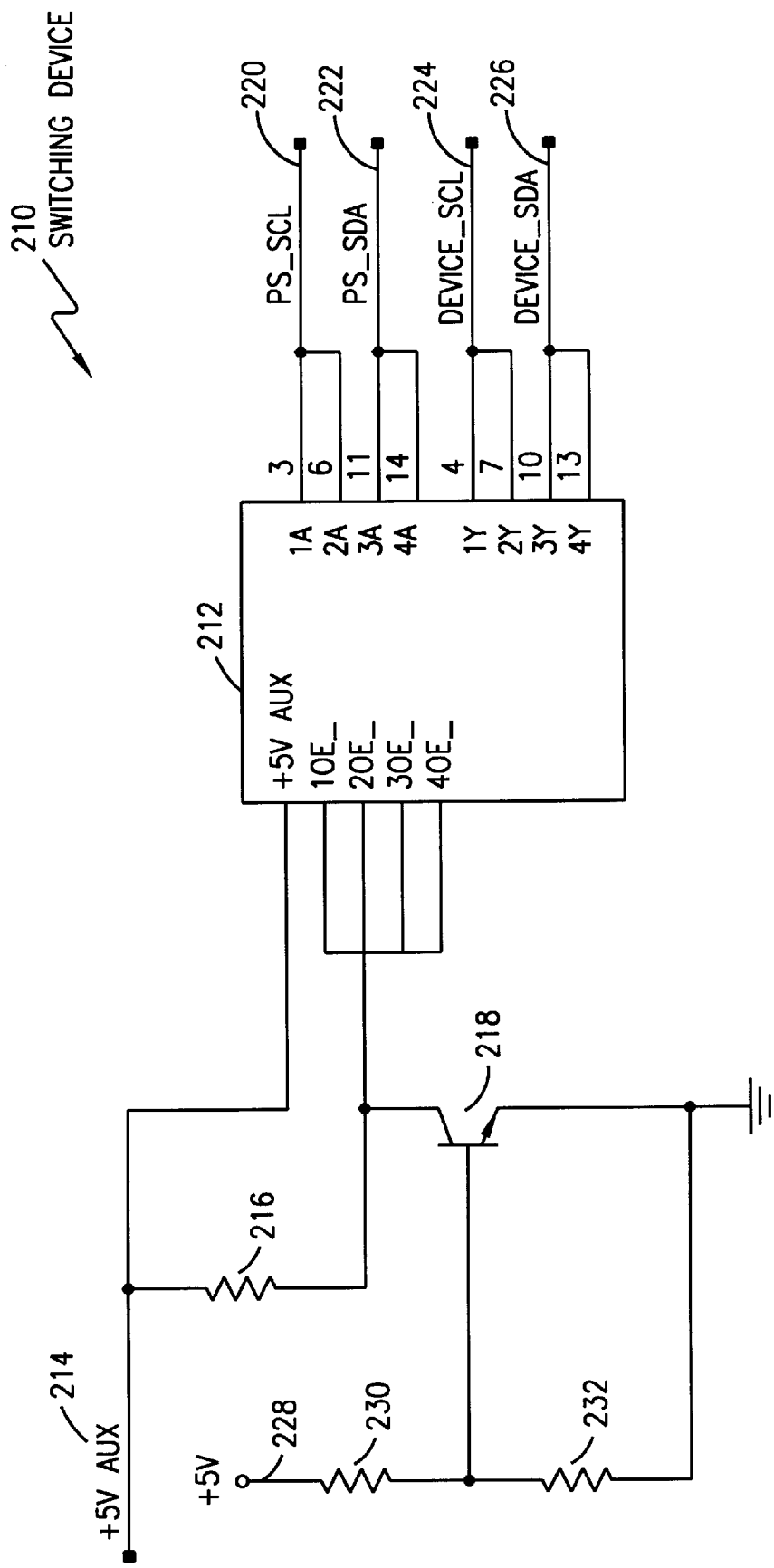
FIG. 2 is a schematic diagram of an exemplary embodiment of a circuit in accordance with the principles of the present invention.

Referring now to FIG. 2, there is shown a more detailed schematic of portion 210 of the computer system 110 shown in FIG. 1. As depicted, a switching device 212 is connected to power input 214, resister 216 and transistor 218. Elements 220, 222, 224 and 226 represent the I²C bus, with clock line PS_SCL 220 and data line PS_SDA 222 for connection to the power supplies 114 and 116, and clock line DEVICE_SCL 224 and data line DEVICE_SDA 226 for connection to peripheral devices 120, 122 and 124. Lines 220 and 222 are selectively connected to lines 224 and 226 with switching device 212. Power input 228 is connected to resisters 230 and 232 and transistor 218. Switching device 212 includes output enable pins labeled lOE_, 2OE_, 3OE_, and 4OE_, and are for receiving the signals to connect or disconnect switching device 212.

Still referring to FIG. 2, and as further depicted, power input 214 is connected to the +5 volt auxiliary supply and power input 228 is connected to receive power from either power supply 114 or 116, as described hereinabove. The voltage applied at input 228, through the open divider network (resistors 230 and 232) controls transistor 218, such that transistor 218 turns on and off at selected voltage levels, which enables or disables switching device 212. The parameters of resistors 230 and 232 determine the voltage level for enabling and disabling switching device 212.

In general operation, when power supplies 114 and 116 are being powered-up, and the voltage at input 228 is below a selected level, switching device 212 is opened or disabled such that I²C lines 220 and 222 are disconnected from I²C lines 224 and 226, permitting communication only between power supplies 114 and 116 over I²C bus 118. When the voltage at input 228 reaches the selected level, switching device 212 is closed or enabled, connecting I²C lines 220 and 224 with I²C lines 224 and 226 respectively. As described hereinabove, when switching device 212 is closed and the lines of I²C data bus 118 are connected, switching device 212 is transparent during the operation of I²C data bus 118.

Those skilled in the art can realize that the teachings of the present invention as described hereinabove provide a data communication bus architecture wherein at least a portion of the data communication bus can be isolated to permit uninterrupted data communication between devices connected to the isolated portion of the data communication bus.

It can be further appreciated that the present invention provides an I²C data bus architecture with redundant power supplies and multiple devices connected to the I²C data bus. The power supplies are connected to the I²C bus such that a switch can isolate the power supplies from the other devices during power-up so that the power supplies can communicate over the I²C bus.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer system comprising:

a first power supply for supplying power to the computer system;

a second power supply for supplying power to the computer system;

at least one computer peripheral device electrically connected to each of said first and second power supplies;

a data bus connected to each of said first and second power supplies and to said at least one computer peripheral device, said data bus for communicating data between said first power supply, said second power supply and said at least one computer peripheral device; and a switching device connected to said data bus intermediate said at least one computer peripheral device and said first and second power supplies, said switching device switchable between a first and second position, said switching device for isolating said first and second power supplies from said at least one computer peripheral device and preventing data communication between said at least one computer peripheral device and both of said first and second power supplies over said data bus and further permitting data communication between said first power supply and said second power supply when said switching device is in said first position.

2. The computer system as recited in claim 1, wherein said data bus is a two wire bus.

3. The computer system as recited in claim 2, wherein said switching device includes a MOSFET transistor.

4. A data communication circuit comprising:

a first slave device;

a second slave device;

a power supply for controlling the operation of said first slave device;

a data bus connected to said first slave device, said second slave device and said power supply, said data bus for communicating data therebetween; and a data coupler connected to said data bus and between said first slave device and said second slave device, said data coupler operable in a first mode for enabling data communication on said data bus between said first slave device and said second slave device and operable in a second mode for disabling data communication on said data bus between said first slave device and said second slave device while permitting continuous data communication between said power supply and said first slave device over said data bus.

5. The communication circuit as recited in claim 4, wherein said first slave device includes a first power supply, and said master device includes a second power supply.

6. The communication circuit as recited in claim 5, wherein said second slave device is electrically connected to said first power supply and said second power supply for receiving power therefrom.

7. The communication circuit as recited in claim 6, wherein said data coupler permits data communication between said first slave device and said second slave device when the power received at said second slave device reaches a selected level of power.

8. The communication circuit as recited in claim 7, wherein said data bus is a two-wire bus.

9. The communication circuit as recited in claim 7, wherein said data bus is an inter-integrated circuit bus.

10. The communication circuit as recited in claim 7, wherein said data coupler includes a switch.

11. The communication circuit as recited in claim 7, wherein said coupler includes a MOSFET transistor.

12. A data communication circuit comprising:

a first slave device;

a second slave device;

a power supply for controlling the operation of said first slave device;

a two-wire data bus connected to said first slave device, said second slave device and said power supply, said two-wire bus for communicating data therebetween; and a coupler connected to said data bus and between said first slave device and said second slave device, said coupler operable in a first mode for enabling data communication between said first slave device and second slave device and operable in a second mode for disabling data communication on said data bus between said first slave device and said second slave device while permitting continuous data communication between said power supply and said first slave device over said data bus.

13. The communication circuit as recited in claim 12, wherein said first slave device includes a first power supply, and said master device includes a second power supply.

14. The communication circuit as recited in claim 13, wherein said second slave device is electrically connected to said first power supply and said second power supply and receives power therefrom.

15. The communication circuit as recited in claim 14, wherein said coupler permits data communication between said first slave device and said second slave device when the power received at said second slave device reaches a selected level of power.

* * * * *